H. J. GERDES.
MACHINE FOR MAKING CRULLERS.
APPLICATION FILED AUG. 7, 1907.

917,581.

Patented Apr. 6, 1909.
3 SHEETS—SHEET 1.

WITNESSES
A. C. Fairbanks.
J. M. Sterne

INVENTOR
Herman J. Gerdes,
BY Webster & Co.,
ATTORNEYS

H. J. GERDES.
MACHINE FOR MAKING CRULLERS.
APPLICATION FILED AUG. 7, 1907.

917,581.

Patented Apr. 6, 1909.
3 SHEETS—SHEET 2.

WITNESSES
A. C. Fairbanks
J. H. Sterne

INVENTOR
Herman J. Gerdes,
BY
Webster & Co.,
ATTORNEYS

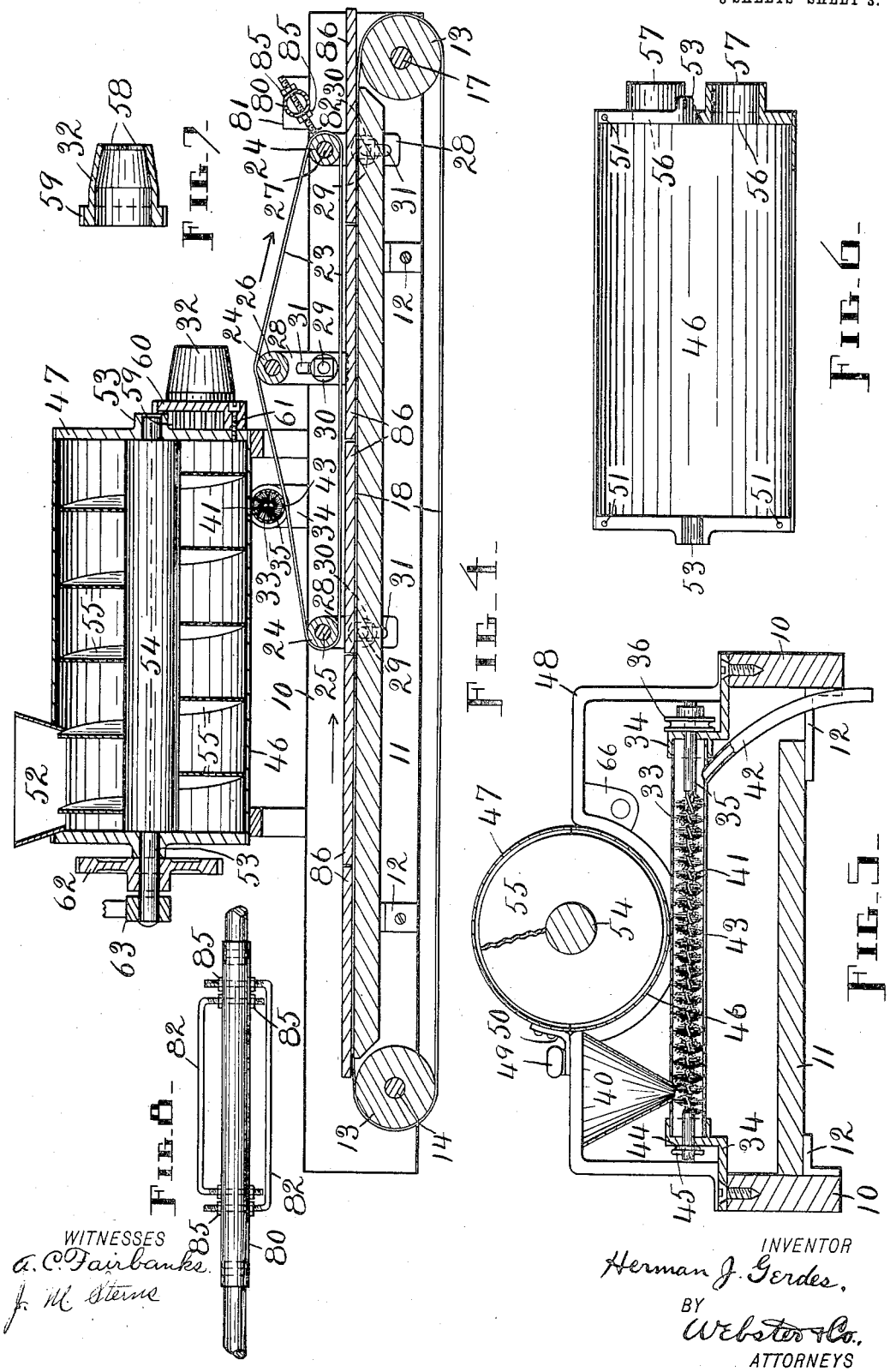

UNITED STATES PATENT OFFICE.

HERMAN J. GERDES, OF SPRINGFIELD, MASSACHUSETTS.

MACHINE FOR MAKING CRULLERS.

No. 917,581.  Specification of Letters Patent.  Patented April 6, 1909.

Application filed August 7, 1907. Serial No. 387,455.

*To all whom it may concern:*

Be it known that I, HERMAN J. GERDES, a citizen of the United States of America, residing at Springfield, in the county of Hampden and State of Massachusetts, have invented a new and useful Machine for Making Crullers, of which the following is a specification.

My invention relates to improvements in machines designed automatically to divide and transform a plastic substance such as dough from the mass state into regular units of predetermined size and shape, in which I employ one or more revoluble members of peculiar construction adapted to divide the mass into continuous strands and twist the substance thus divided, means to force the mass into and through such member or members, suitable conveyers, novel means to distribute flour or other powder over one of said conveyers, a novel cutter, and such other parts and members as may be required in making these elements effective, all as hereinafter set forth.

The objects of my invention are, first, to produce a machine which is adapted automatically and rapidly to change or form a batch of dough into a plurality of twisted doughnuts or crullers cut to the proper length and made ready for frying, whereby a large saving in time, labor and material is effected; second, to furnish such a machine with forcing, twisting, conveying, powdering, and cutting devices and mechanisms which are comparatively simple in construction and operation and yet are capable of performing their several operations or functions expeditiously and in an economical manner, and, third, to afford means for readily taking the machine apart so that it can be thoroughly cleaned.

Although this machine is intended particularly for making crullers, it might be employed in the manufacture of any other article, whether of diet or not, wherein a plastic mass has to be worked up into a twisted or rope-like condition or formed into twisted strands which may be cut into lengths if desired.

I attain the objects above pointed out by the mechanism illustrated in the accompanying drawings, in which—

Figure 1:
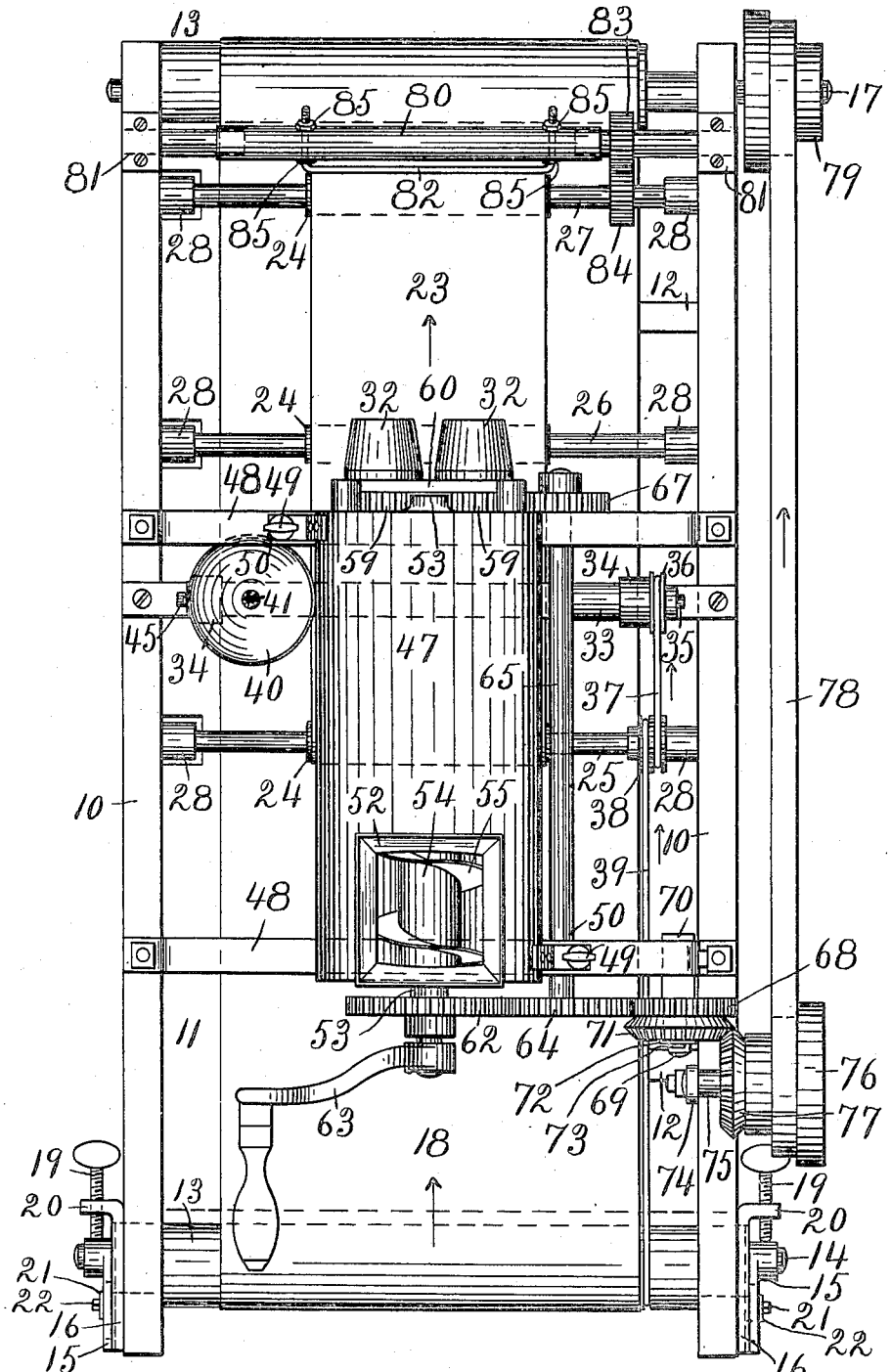
Figure 2:
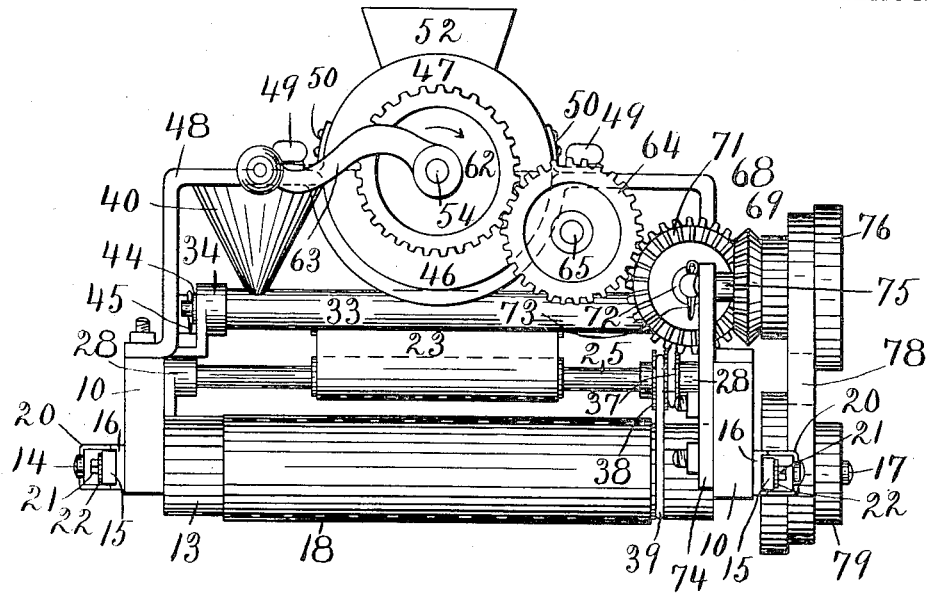
Figure 3:
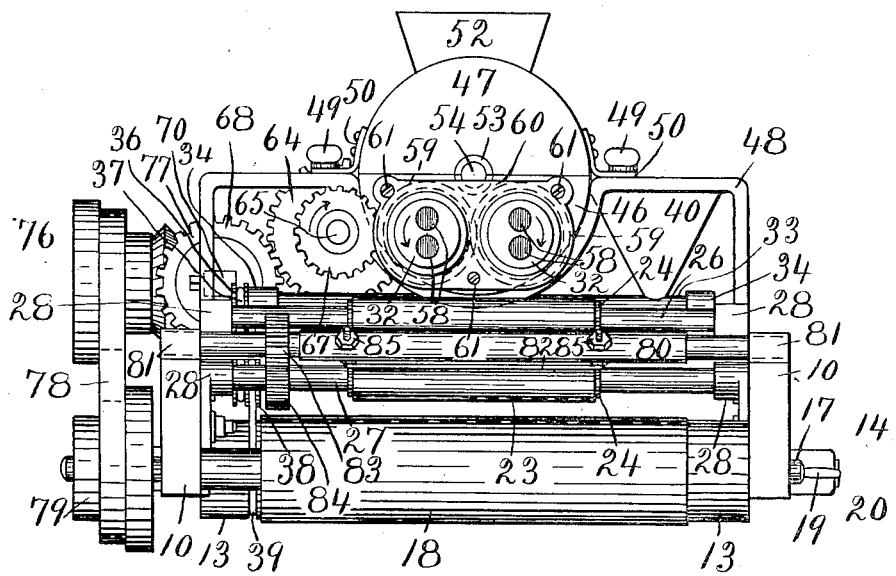

Figure 1 is a plan view of my machine; Fig. 2, a front end elevation of said machine; Fig. 3, a rear end elevation of the same; Fig. 4, a central longitudinal vertical section through the machine; Fig. 5, a longitudinal section through the powder distributer and a cross-section through the receptacle for the dough with connected and connecting parts; Fig. 6, a plan view of the lower half of said receptacle, one corner being cut away to show one of the twister bearings in section; Fig. 7, a longitudinal section of one of the twisters, and, Fig. 8, a view of a double cutter.

Similar figures refer to similar parts throughout the several views.

Referring to the drawings which show a practical embodiment of one form of my invention, it will be observed that I provide a supporting frame for the mechanism consisting of two side rails 10 and an intermediate platform or table 11 connected by a plurality of angle-irons 12 with said rails. The table 11 is not as wide as the space between the side rails, nor is said table as long as said rails. The arrangement is such that the table does not extend clear across to the right-hand side rail 10, the space thus left being bridged by the angle-irons 12 on this side. At the front end of the table is a roller 13 mounted on a shaft 14 journaled in adjustable bearing-boxes 15—15 mounted to slide in bearing-blocks 16—16 rigidly fastened against the outer faces of the rails 10, and at the rear end of said table is a similar roller 13 mounted on a shaft 17 suitably journaled in the side rails. An endless belt or apron 18 is supported on and actuated by the rollers 13, and the proper tension is given to such apron by means of thumb-screws 19—19 in threaded engagement with outwardly-turned ears 20—20 on the bearing-blocks 16, said thumb-screws receiving against their front ends the adjacent ends of the bearing-boxes 15. Each bearing-block 16 is slotted as is also the rail 10 to which it is fastened for the passage of the associated terminal of the shaft 14, and each bearing-box 15 is slotted for the accommodation of a bolt 21 which passes through the same into threaded engagement with the contiguous bearing-block, said bolt with a washer 22 assisting to retain said bearing-box in place in its block and when tightened assisting the associated adjusting screw 19 to securely hold the box against endwise movement. The adjustment of the front roller 13 is effected by loosening the bolts 21, turning the thumb-screws 19 either forward or backward as may be required, and then retightening said bolts. Above the table 13 and the reach of the apron 18 thereon is a second endless belt or apron 23, shorter and narrower than the first, carried on three rollers 24, the shafts (designated by the numbers 25, 26 and 27 consecutively from front to back) of which rollers are journaled in bearings 28 attached to the inside faces of the side rails by bolts 29 and washers 30. The shanks of the bearings 28 are slotted, as shown at 31 in Fig. 4, for the bolts 29 in order to provide for whatever adjustment of said bearings that may be required. The middle roller 24 is higher than the other two and is located below two twisters 32 presently to be described.

A distributer tube 33 for flour is mounted above and in contact with the upper reach of the apron 23 which is between the first two rollers 24 in supporting brackets 34—34 fastened to the upper edges of the said rails and extending inward therefrom. A shaft 35, which extends longitudinally through the tube 33 and is journaled in the brackets 34, has a pulley 36 tight on the right-hand protruding terminal thereof, and a belt 37 connects this pulley with a double pulley 38 tight on the shaft 25. A belt 39 connects the pulley 38 with the front roller 13. In order to prevent the dough, which the apron 23 receives from the twisters 32, from sticking to said apron it is necessary to cover the surface of the latter upon which said dough falls and which conveys the dough away from said twisters with a thin layer or coating of flour, and to this end I provide a distributing device which comprises the tube 33, a funnel 40, the shaft 35 for a spiral brush 41, and a pipe 42. The funnel 40 constitutes a reservoir for the flour and is mounted on the tube 33 at the left-hand end and opens at the bottom into said tube. The brush 41 is so made that when revolved it actuates the flour, which enters the tube from the funnel, to the right over a longitudinal slot 43 in the bottom of said tube through which the flour escapes onto the apron immediately below. Any excess of flour which may collect in the right-hand end of the tube escapes through the pipe 42, which opens at its upper end into the bottom of said tube at the right hand end, into a suitable receptacle (not shown) placed to receive it, the flour thus escaping being again utilized by introducing it into the tube by way of the funnel as before. The slot 43 should not be longer than the apron 23 is wide. Perforations might be substituted for said slot. The shaft 35 is held against endwise movement by the pulley 36 at one end and a washer 44 and pin 45 at the other end.

A receptacle, preferably in the form of a cylinder, comprising a lower section 46 and an upper section 47 is supported above the forward roller 24 and the distributer tube 33 on two bridges or brackets 48 mounted on the side rails 10 and extending across from side to side. The lower section 46 is rigidly and permanently attached to the bracket 48, and the upper section 47 is secured in position over said section 46 by being fastened to said brackets with thumb-screws 49 which pass through lugs 50 on said section 47 into threaded engagement with the brackets. The upper section can be removed from the lower section upon taking out the thumb-screws 49. Pins 51, Fig. 6, may be provided in one section to enter corresponding holes in the other section for the purpose of alining the superimposed section and keeping it in proper position on the section below. This cylindrical receptacle is for the dough mass which is introduced through a funnel 52 formed on top of the section 47 at the front end. Suitable bearing-boxes 53—53 are formed in the center at the ends of the receptacle or cylinder for a shaft 54. The shaft 54 has a worm 55 on that part of the shaft which is within the cylinder. In the rear end of the lower section are two openings 56 which form exits from the cylinder. External flanges 57—57 encircle the openings 56 and the twisters 32 are mounted to revolve on the bearings thus formed. Although two twisters and the same number of hollow bearings therefor are shown, it is evident that there may be more or less than that number. Each twister 32 in the present case consists of a cup-like member open in front to receive one of the flanges 57 upon which it is mounted and to communicate with the interior of the cylinder, and closed behind except for two or more holes 58 therein. At the front ends of the twisters are gears 59—59 adapted to mesh with each other when said twisters are in place on their bearing flanges. The twisters are held in operative position by a frame 60 which fits over them and is secured to the adjacent end of the lower section 46 by screws 61, the gear 59 being left free to revolve between adjacent surfaces of said frame and section. Upon unscrewing the frame 60 and removing it the twisters can be easily slipped off of their bearings.

The front terminal of the shaft 54, which protrudes from the cylinder, has a gear 62 and a crank 63 tight thereon. When the shaft 54 is in place the gear 62 meshes with a gear 64 tight on the front end of a shaft 65 journaled in suitable bearings which form parts of the brackets 48, one of such bearings appearing at 66 in Fig. 5. Tight on the rear end of the shaft 65 is a gear 67 which meshes with one of the twister gears 59 and so drives the twisters. The gear 64 meshes with a gear 68 loose on a stud 69 projecting forward from an arm 70 bolted to the right-hand upright of the front bracket 48. On the face of the gear 68 is a bevel-gear 71. A washer 72 and a pin 73 may be employed to prevent axial movement on the part of the gears 68 and 71. A fixed upright 74 rises in front of the bevel-gear 71 from the adjacent side rail, and said upright supports an outwardly-extending stud 75 upon which is loosely mounted a speed-pulley 76 having a bevel-gear 77 rigidly secured to its left-hand end to mesh with the other bevel-gear. A belt 78 connects the speed pulley 76 with a speed pulley 79 tight on the terminal of the shaft 17 which projects beyond the right-hand side rail.

From the above it will be seen that all of the rotary members are driven from and by the crank 63 when turned, and driven in the proper directions when said crank is turned in the direction of the arrow in Fig. 2 to force the dough backward in the cylinder and to actuate the upper reaches of the aprons 18 and 23 rearwardly. The shaft 54 and its worm 55 are rotated directly by the crank; the twisters 32 are rotated by said crank through the medium of said shaft, the gears 62 and 64, the shaft 65, and the gears 67 and 59; the apron 18 is actuated by the crank through the medium of the shaft 54, the gears 62, 64, 68, 71 and 77, the pulleys 76 and 79 and the belt 78, the shaft 17, and the rear roller 13; the apron 23 is actuated through the medium of the front roller 13 which is driven by said apron 18, the belt 39 and the pulley 38; and the belt 37 and pulley 36 rotate the shaft 35 with its brush 41 from said pulley 38.

The cutter, which acts in conjunction with the rear roller 24, consists of a shaft 80 having its ends journaled in bearing-blocks or bearing-boxes 81—81 mounted on the side rails at or near the rear end, and of a bent rod 82, or cutter proper, attached to said shaft and so arranged relative to the adjacent roller 24 or the apron 23 where it passes over said roller that the longitudinal cutting portion of such rod, which lies in one of the radial planes of the shaft, touches said apron at each revolution of the shaft. The shaft 80 is driven in the opposite direction to that of the adjacent roller through the medium of a gear 83 tight on said shaft and a meshing gear 84 tight on the roller shaft 27. The bent ends of the rod 82, which pass through the shaft 80, are screw-threaded to receive nuts 85 on both sides of said shaft, by means of which said rod is held securely in place and may be adjusted toward and away from the co-acting roller. This is the single cutter illustrated in Figs. 1, 3 and 4. A double cutter is shown in Fig. 8 wherein two rods 82 and two sets of nuts 85 are provided. The single cutter performs its function once at each revolution, while the double cutter performs its function twice at each revolution, the crullers cut by the first being double the length of those cut by the second, provided the gears 83 and 84 are the same in both cases. More than two rods 82 may be provided if desired, but in all cases the cutting part which is the shorter or shortest should measure the same approximately as does the width of the apron 23.

Instead of adding one or more rods 82 to the shaft 80 for the purpose of decreasing the length of the crullers, this may be accomplished by using a larger drive gear on the shaft 27 than the driven gear on the shaft 80; and by reversing this order the length of the crullers will be increased.

The complete operation of the machine is as follows, the arrow indicating the normal directions of rotary and moving parts: The dough is introduced into the cylinder through the funnel 52 and the crank 63 is turned in the proper direction for the worm 55 to force said dough to the rear and out of said cylinder through the openings 56 into the revolving twisters 32. From the twisters the dough is forced out through the holes 58 onto the traveling apron 23 below, by the moving mass behind, and is thus formed into twisted strands or ropes, owing to the fact that the dough emerges from each twister in two continuous lines or strands which are at once twisted together by the rotary motion of the twister and particularly of that part of the same in which said holes are situated, that is, the back end. Meanwhile the revolving spiral brush 41 has caused flour from the funnel 40 to be distributed over the apron 23, in the manner hereinbefore explained, so that the ropes of dough do not come into direct contact with said apron, or at least they are prevented from adhering too tightly thereto. When the twisted strands arrive at the cutter they are severed thereby into lengths suitable for frying and for the market, the operation of the cutter having been already fully described. The apron 18 is designed to carry rectangular pieces 86 of wood to receive the crullers when they leave the apron 23 and on which they are conveyed away from the machine, generally by hand, to be fried. The machine will continue to turn out crullers of predetermined size and length as long as such machine is operated and is supplied with dough and flour.

The machine may be driven by a motor instead of by hand, and it may be driven by applying power at some other point than directly to the shaft 54, without making changes other than will readily occur to one skilled in the art. Various other changes in the driving mechanism or in the method of actuating the different rotary members may be made without departing from the nature of my invention; and other adjusting means for the shaft 14 and for the other parts which are adjustable may be substituted for those herein employed.

It is very necessary that a machine of this kind be kept clean, therefore provision is made for easily and quickly unfastening certain of the members so that they can be removed for this purpose and so as to give access to other members which also need to be cleaned. The parts with which the dough comes directly and forcibly into contact, that is, the cylinder, the worm, and the twisters, are the ones which especially require cleaning and require it frequently, and these parts are separated in the following manner: The thumb-screws 49 are removed and the section 47 is lifted from the section 46 and then the shaft 54 with its worm is taken out of said section 46, which leaves the two cylinder sections and the worm in condition to be cleaned. The twisters 32 are separated from the section 46 by first removing the screws 61 and then taking off the frame 60 when said twisters can be slipped from the flanges 57. After being cleaned the separated parts are reassembled and left in operative condition as before. Occasionally the distributer should be removed and taken apart to be cleaned, but it will be seen readily how this and other members can be detached from the machine and the parts separated whenever it is necessary or desirable for any reason to do so.

Although the fastening devices for the receptacle or cylinder sections and for the twisters are entirely adequate for the purpose for which they are intended, it is obvious that they might be modified more or less, therefore I do not wish to be restricted in these particulars, nor do I wish to be restricted in any of the minor details of construction, whether herein specifically noted or not.

What I claim as my invention, and desire to secure by Letters Patent, is—

1. A machine, of the class described, comprising a receptacle, one or more perforated rotary twisters opening into such receptacle, means to force a mass from said receptacle into and through such twister or twisters, a conveyer partially below the receptacle and twister or twisters, and a powder distributer for said conveyer located bodily between the receptacle and that part of the conveyer that is beneath the receptacle.

2. A machine, of the class described, comprising a receptacle, one or more perforated rotary members or twisters opening into such receptacle, means to force a plastic mass from said receptacle into and through such twister or twisters, such mass being formed into a twisted strand or strands, a conveyer below said twister or twisters to receive such twisted strand or strands, and a cutter co-acting with said conveyer to sever the strand or strands on the latter.

3. A machine, of the class described, comprising a receptacle, one or more perforated rotary members or twisters opening into such receptacle, means to force a plastic mass from said receptacle into and through such twister or twisters, a conveyer below the latter and below the receptacle, a powder distributer for such conveyer between it and the receptacle, and a cutter co-acting with said conveyer.

4. A machine, of the class described, comprising a conveyer, a second conveyer above the first, a receptacle, one or more perforated rotary members or twisters opening into such receptacle and located above such second conveyer, means to force a plastic mass from said receptacle into and through such twisters, such mass thus being formed into twisted strands which are received on the upper conveyer, and a cutter above said first conveyer co-acting with said second or upper conveyer to sever the twisted strands on the latter, the severed parts falling on to the first or lower conveyer.

5. In a machine of the class described, a receptacle having an opening in one end and provided with an external flange or bearing around such opening, a rotary member mounted on such bearing and communicating through said opening with the interior of said receptacle, said rotary member having holes in its outer end and being provided at its inner end with an external gear, and a frame fitting over said rotary member outside of said gear and being attached to said end of the receptacle to hold said member in place on its bearing without interfering with the rotation of the member by its gear.

6. The combination, in a machine of the class described, with a receptacle having a worm therein, a rotary perforated twister revolubly mounted at one end of such receptacle and opening into the same, and a traveling apron below said twister and receptacle, of a powder distributer situated bodily between said apron and said receptacle and opening onto the former.

7. The combination, in a machine of the class described, with a traveling apron, and a receptacle above such apron, of a powder distributer independent of said receptacle and comprising a tube positioned between such apron and receptacle and opening onto the former, with a rotary spiral brush in said tube.

8. The combination, in a machine of the class described, with a traveling apron, and a receptacle above such apron, of a powder distributer comprising a tube positioned between such apron and receptacle and opening onto the former, a reservoir opening into such tube at one end, and a rotary spiral brush in said tube arranged and adapted to actuate the powder which enters the tube from said reservoir toward the opposite end of the tube.

9. The combination, in a machine of the class described, with a traveling apron, and a receptacle above such apron, of a powder distributer comprising a tube positioned between such apron and receptacle and opening onto the former, a reservoir opening into such tube at one end, a rotary spiral brush in said tube arranged and adapted to actuate the powder which enters the tube from said reservoir toward the opposite end of the tube, and a medium of discharge for the excess at such opposite end.

10. In a machine of the class described, a cutter comprising a shaft and a bent rod attached thereto by its bent terminals, and means for adjusting said rod relative to said shaft so that the cutting part of the rod which is parallel with the shaft shall be closer to or farther away from the latter.

11. The combination, in a machine of the class described, of a receptacle having a worm therein, one or more rotary twisters connected with said receptacle and opening into the same, an apron and rollers therefor, such apron being below such twister or twisters, and driving mechanism for said apron consisting in part of a second apron below the first and rollers therefor.

12. The combination, in a machine of the class described, of a receptacle having a worm therein, one or more rotary twisters connected with said receptacle and opening into the same, an apron and rollers therefor, such apron being below such twister or twisters, a perforated tube located above said apron, a spiral brush in said tube, and driving mechanism for said apron and brush, such mechanism consisting in part of a second apron and rollers therefor.

13. The combination, in a machine of the class described, of a receptacle having a worm therein, one or more rotary twisters connected with said receptacle and opening into the same, an apron and rollers therefor, such apron being below such twister or twisters, driving mechanism for said apron consisting in part of a second apron and rollers therefor, and a cutter driven from the first-mentioned apron and arranged to co-act therewith.

14. The combination, in a machine of the class described, of a receptacle having a worm therein, one or more rotary twisters connected with said receptacle and opening into the same, an apron and rollers therefor, such apron being below such twister or twisters, a perforated tube located above said apron, a spiral brush in said tube, driving mechanism for said apron and said brush, such mechanism consisting in part of a second apron and rollers therefor, and a cutter driven from the first-mentioned apron and arranged to co-act therewith.

HERMAN J. GERDES.

Witnesses:
WM. RATTMAN,
F. A. CUTTER.